J. S. GAMMON.
VEHICLE WHEEL.
APPLICATION FILED NOV. 21, 1910.
1,007,088.
Patented Oct. 31, 1911.
2 SHEETS—SHEET 1.
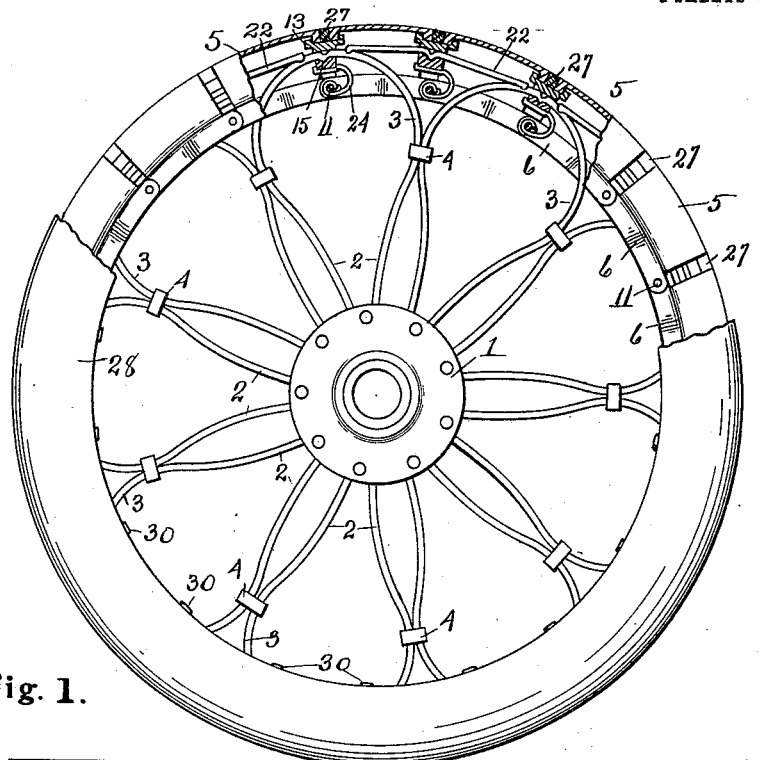
Fig. 1.
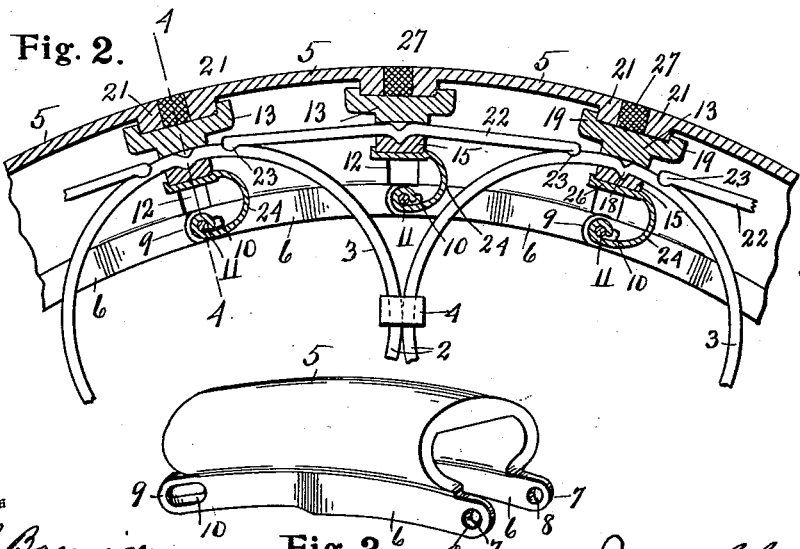
Fig. 2.
Fig. 3.
Witnesses
O. B. Baenziger
J. G. Howlett
Inventor
James S. Gammon
By E. S. Wheeler Attorney.
COLUMBIA PLANOGRAPH CO., WASHINGTON, D. C.

J. S. GAMMON.
VEHICLE WHEEL.
APPLICATION FILED NOV. 21, 1910.
1,007,088.
Patented Oct. 31, 1911.
2 SHEETS—SHEET 2.
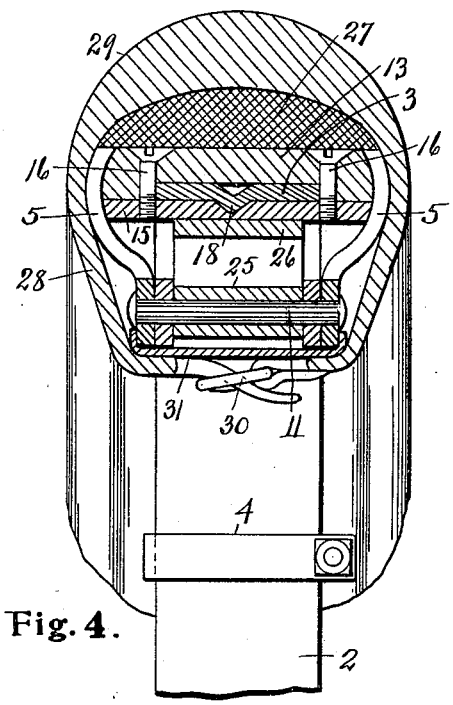
Fig. 4.
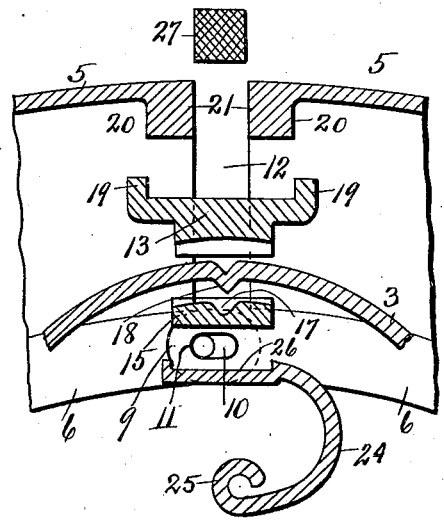
Fig. 5.
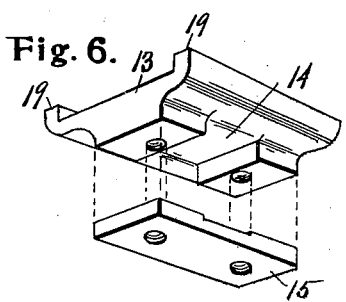
Fig. 6.
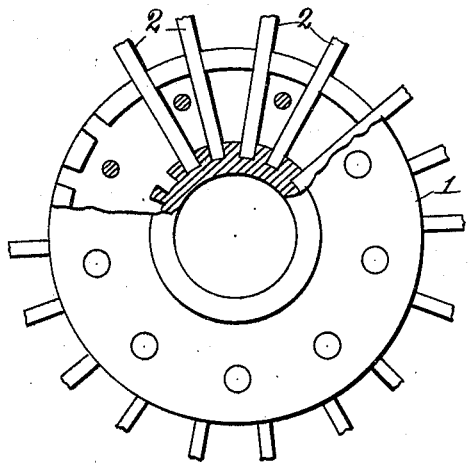
Fig. 7.
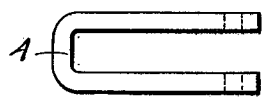
Fig. 8.
Fig. 9.
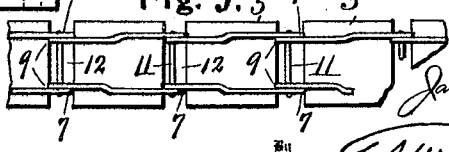
Witnesses
Q. B. Baeyziger
J. G. Howlett
Inventor
James S. Gammon
By
T. W. Wheeler, Attorney.
COLUMBIA PLANOGRAPH CO., WASHINGTON, D. C.

UNITED STATES PATENT OFFICE.

JAMES S. GAMMON, OF LEES SUMMIT, MISSOURI.

VEHICLE-WHEEL.

1,007,088.   Specification of Letters Patent.   Patented Oct. 31, 1911.

Application filed November 21, 1910. Serial No. 593,299.

*To all whom it may concern:*

Be it known that I, JAMES S. GAMMON, a citizen of the United States, residing at Lees Summit, in the county of Jackson, State of Missouri, have invented certain new and useful Improvements in Vehicle-Wheels; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to new and useful improvements in vehicle wheels, and consists in the construction and arrangement of parts hereinafter more fully set forth and pointed out particularly in the claims.

The object of the invention is to provide simple and efficient means for relieving the occupant of the vehicle from excessive shock and jar, and for obviating the expense and annoyance incident to the use of the ordinary pneumatic tire. The above object is attained by the structure illustrated in the accompanying drawings, in which:—

Figure 1 is an elevation of a vehicle wheel embodying my invention, parts being broken away, and other parts being in section. Fig. 2 is a fragmentary view in circumferential section through a portion of the rim of a wheel embodying my invention. Fig. 3 is a perspective view of one of the rim sections. Fig. 4 is a transverse section through the rim, felly, and casing at one of the joints between the joined sections of the rim, as on line 4—4 of Fig. 2. Fig. 5 is a fragmentary view in circumferential section through the meeting ends of two of the rim sections at one of the joints in the rim at the point of connection of a looped spoke therewith, the parts being unassembled. Fig. 6 is a perspective view of one of the chair-plates located at the joints in the rim, and of one of the cross plates coöperating with said chair-plate to secure the looped spoke within the rim of the wheel. Fig. 7 is a view partly in section of the hub of the wheel, showing the manner of securing the ends of the spokes therein. Fig. 8 is an elevation of one of the clips employed for tying the contiguous portions of the looped spokes together. Fig. 9 is an inverted plan of a portion of the rim of the wheel, showing the manner of joining the sections thereof, other parts being omitted.

Referring to the characters of reference, 1 designates the hub of the wheel consisting of opposed circular disks between which are confined the inner ends of the spokes 2 in the manner shown in Fig. 7. These spokes are formed of flat strips of spring steel, or other resilient material, and each at its outer end is formed into a circular loop 3. The spokes 2 are so disposed in the wheel as to cause the looped portions 3 thereof to lie contiguous, as shown in Figs. 1 and 2, said contiguous portions of said loops being fastened together by suitable embracing clips 4, whereby said spokes which are extremely resilient, become braced against one another and are held more firmly in place. The rim of the wheel is jointed and is composed of a series of curved sections 5, the body portions of which are oval in transverse section to give the proper shape to the tire of the wheel. These rim sections 5 are each provided with parallel marginal flanges 6 which extend beyond the ends of the body portion of said rim section, said flanges at one end forming the projecting ears 7 having the transverse apertures 8, and at the other end the projecting ears 9 having the longitudinally extending slots 10. The flanges 6 at one end of each section are brought closer together than at the opposite end so that the space between the ears 9 shall be less than the space between the ears 7, an arrangement which allows the ears 9 of each section to enter between the ears 7 of the succeeding section, as clearly shown in Fig. 9, the apertures 8 in the ears 7 registering with the slots 10 in the ears 9 of the succeeding section so as to enable the pivot bolts 11 to be passed therethrough, and thereby effect a hinge connection between the ends of the joined sections 5 of the rim, the slots 10 in one pair of the projecting ears of each section allowing for relative circumferential movement between the sections of the rim for purposes hereinafter stated. The manner of joining the sections 5 of the rim through the medium of the pivot bolts 11 which pass through the projecting ears of said rim sections, leaves an open space 12 (see Figs. 5 and 9) between the ends of said rim sections.

The loops 3 of the spokes enter between the flanges of the rim sections and are secured in the rim by means of the chair plates 13, each of which is provided in its under face with a transverse channel 14, as clearly shown in Fig. 6. The looped portions of the spokes lie in the channels 14 of the chair plates, and are held therein by the cross plates 15 which cross the loops of the spokes transversely and are secured to the under faces of the chair plates by the screw bolts 16. To prevent a possible movement of the curved portion 3 of the spokes through the channels in the under faces of the chair plates, each of the cross plates 15 is provided with a central depression 17 therein (see Fig. 5) in which a lug 18 on the looped portion of the spoke is adapted to lie, whereby when the screw bolts 16 are screwed into place, said parts become firmly locked together, as clearly shown in Fig. 4. To hold the chair plates in proper relative position throughout the circumference of the rim of the wheel, said plates are each provided with marginal flanges 19 which are engaged by the shoulders 20 of the abutments 21 at the ends of the rim sections 5, said shoulders interlocking with said flanges, as clearly shown in Figs. 1 and 2 when the parts are properly assembled, whereby the chair plates are not only correctly positioned in the rim but the rim sections are securely locked together in a manner to resist circumferential strain.

It will be noted that the spokes of the wheel support each alternate joint between the sections forming the rim; to flexibly support the intervening joints, bridge springs 22 are employed which are secured between the chair plates 13 and the cross plates 15 in the same manner as are the loops 3 of the spokes, said bridge springs being co-extensive in width with the spokes and having a slidable terminal engagement therewith, being confined in place by the embracing ears 23 at the ends thereof which engage the edges of said looped portions of the spokes. As a flexible mounting for the chair plates and for the spoke loops and bridge springs which they support, there are employed the curved auxiliary springs 24 having at one end an eye 25 which embraces the pivot bolts 11 and at the other end a depressed seat 26 which receives the cross plate 15. These springs constantly urge outwardly the mountings for the loops 3 and bridge springs 22 and keep the flanges of the chair plates in engagement with the shoulders of the abutments 21 of the rim sections, thereby maintaining a flexible connection between the spokes and the rim of the wheel.

Resting upon the chair plates 13 and interposed between the abutments 21 at the ends of the rim sections 5 are compressible blocks 27 of rubber, or analogous material. These blocks form complementary portions of the periphery of the rim and are so disposed as to become compressed between the abutments 21 of the rim sections when the pivotal joints between said sections are forced inwardly in the direction of the axis of the wheel, thereby serving to stiffen said joints in addition to the resisting force afforded by the spring loops 3 of the spokes and the bridge springs 22.

By means of the structure herein shown and described, the rim of the wheel is rendered resilient and is also resiliently or flexibly connected to the hub through the medium of the spring spokes 2. In practice, when the wheel encounters an obstruction, the joints between the rim sections will spring inwardly against the action of the spring loops 3 of the spokes and the bridge springs 22, the slots 10 in the ears 9 of the rim sections permitting the pivot bolts 11 to slide to accommodate this movement. The proximity of these slidable spring-supported joints in the rim of the wheel, gives to the rim a high degree of flexibility which absorbs to a great extent the shock incident to encountering an object on the road while the flexibility of the spokes 2 coöperates with the resilient rim in reducing to the minimum the jar or shock which is transmitted to the axle. The parts are self-restoring so that upon passing an obstruction, or upon rolling from contact with the road surface, the rim instantly assumes its true circular form.

To afford a flexible tread for the rim of the wheel, a casing of rubber, or equivalent material 28, is employed having a suitable tread portion 29, the margins of said casing lapping onto the inner face of the rim and being secured by buckles 30, or other suitable fastening means.

To exclude water from the interior of the tire, its inner edges are covered by a strip of leather 31, or other flexible material, onto which the margins of the casing extend to hold it in place, as clearly shown in Fig. 4.

Having thus fully set forth my invention, what I claim as new and desire to secure by Letters Patent, is:—

1. In a vehicle wheel, a hub, a rim, comprising sections pivotally joined, chair plates crossing the joints in the tread of the rim between the sections thereof, and resilient spokes extending from the hub and supporting said chair plates.

2. In a vehicle wheel, a hub, a rim comprising pivotally joined sections, said sections at the outer circumference of the rim having engageable members, chair plates crossing the joints between said sections and engaging said members, and resilient spokes extending from the hub and supporting said chair plates.

3. In a vehicle wheel, a hub, a rim comprising pivotally joined sections, said sections at the outer circumference of the rim having engageable members, chair plates crossing the joints between said sections and engaging said members, compressible blocks between the ends of the rim sections, and resilient spokes extending from the hub and supporting said chair plates.

4. In a vehicle wheel, a hub, a rim comprising sections pivoted together, chair plates crossing the joints between said sections within the rim, resilient spokes extending from the hub and connected to said chair plates, and spring members connecting said chair plates with the joints between the sections of the rim.

5. In a vehicle wheel, a hub, a rim comprising jointed sections, chair plates crossing the joints between the sections of the rim, flexible spokes extending from the hub and connected to each alternate chair plate, bridge springs bearing on said spokes and supporting the intermediate chair plates, and resilient members connecting all of said chair plates with the joints in the rim.

In testimony whereof, I sign this specification in the presence of two witnesses.

JAMES S. GAMMON.

Witnesses:
I. G. HOWLETT,
O. B. BAENZIGER.

---

Copies of this patent may be obtained for five cents each, by addressing the "Commissioner of Patents, Washington, D. C."